United States Patent
Haneefa et al.

(10) Patent No.: US 7,917,614 B2
(45) Date of Patent: Mar. 29, 2011

(54) FAULT TOLERANCE IN A CLIENT SIDE PRE-BOOT EXECUTION

(75) Inventors: Riyashmon Haneefa, Palakkad (IN); Baskaran Krishnamurthy, Namakkal (IN)

(73) Assignee: International Business Machines Corporation, Armonk, NY (US)

(*) Notice: Subject to any disclaimer, the term of this patent is extended or adjusted under 35 U.S.C. 154(b) by 309 days.

(21) Appl. No.: 12/136,299

(22) Filed: Jun. 10, 2008

(65) Prior Publication Data

US 2009/0307340 A1    Dec. 10, 2009

(51) Int. Cl.
   *G06F 15/173*    (2006.01)
   *G06F 15/177*    (2006.01)
   *G06F 15/16*    (2006.01)

(52) U.S. Cl. ........ 709/224; 709/222; 709/220; 709/217; 709/219

(58) Field of Classification Search .......... 709/224, 709/222, 220, 217, 219
See application file for complete search history.

(56) References Cited

U.S. PATENT DOCUMENTS

| | | | |
|---|---|---|---|
| 5,974,546 A * | 10/1999 | Anderson | 713/2 |
| 5,996,074 A * | 11/1999 | Houck et al. | 713/2 |
| 6,038,689 A * | 3/2000 | Schmidt et al. | 714/48 |
| 6,377,992 B1 * | 4/2002 | Fernandez et al. | 709/227 |
| 6,532,537 B1 * | 3/2003 | Chen et al. | 713/2 |
| 6,560,702 B1 * | 5/2003 | Gharda et al. | 713/2 |
| 6,748,525 B1 * | 6/2004 | Hubacher et al. | 713/1 |
| 6,763,479 B1 * | 7/2004 | Hebert | 714/4 |
| 6,854,072 B1 * | 2/2005 | Cagle et al. | 714/15 |
| 6,876,652 B1 * | 4/2005 | Bell et al. | 370/386 |
| 7,017,038 B1 * | 3/2006 | LaChance et al. | 713/2 |
| 7,072,807 B2 * | 7/2006 | Brown et al. | 703/1 |
| 7,103,762 B2 * | 9/2006 | Harper et al. | 713/1 |
| 7,111,189 B1 * | 9/2006 | Sicola et al. | 714/6 |
| 7,114,096 B2 * | 9/2006 | Freimuth et al. | 714/13 |
| 7,127,597 B2 * | 10/2006 | Backman et al. | 713/1 |
| 7,155,512 B2 * | 12/2006 | Lean et al. | 709/224 |
| 7,231,430 B2 * | 6/2007 | Brownell et al. | 709/218 |
| 7,320,084 B2 * | 1/2008 | Steinmetz et al. | 714/4 |
| 7,523,350 B2 * | 4/2009 | Lintz et al. | 714/36 |
| 7,536,370 B2 * | 5/2009 | Masurkar | 706/47 |
| 7,715,321 B2 * | 5/2010 | Cardona et al. | 370/242 |
| 7,716,464 B2 * | 5/2010 | Rothman et al. | 713/2 |
| 2002/0080575 A1 * | 6/2002 | Nam et al. | 361/686 |

(Continued)

OTHER PUBLICATIONS

Dave Jaffe, "Examining Web Serving on the PowerEdge 1655MC", Dell Power Solutions, http://www.dell.com/content/topics/global.aspx/power/en/ps1q03_jaffe, 7 pages.

(Continued)

*Primary Examiner* — Dohm Chankong
*Assistant Examiner* — Angela Widhalm
(74) *Attorney, Agent, or Firm* — Stephen J Walder, Jr.; Diana R. Gerhardt (57) ABSTRACT

A mechanism for uninterrupted booting of a client computer coupled to a pre-boot execution server computer over a network is provided. The client computer has at least two or more network interface cards. A network bootstrap file is downloaded from the server computer to the client computer. The network bootstrap file is configured to monitor the booting process of the client computer. On detection that the network interface card has failed to transmit or receive packets, the network bootstrap file is configured to switch over to the next available network interface card on the client system thereby providing uninterrupted execution of the booting process.

7 Claims, 3 Drawing Sheets

U.S. PATENT DOCUMENTS

| | | |
|---|---|---|
| 2002/0161868 A1 | 10/2002 | Paul et al. |
| 2002/0198972 A1 | 12/2002 | Babbitt et al. |
| 2005/0058063 A1* | 3/2005 | Masuyama et al. ........... 370/217 |
| 2006/0010316 A1 | 1/2006 | Burokas et al. |
| 2006/0010345 A1 | 1/2006 | Schnoebelen et al. |
| 2006/0059331 A1* | 3/2006 | Zilavy et al. ...................... 713/2 |
| 2006/0288202 A1* | 12/2006 | Doran et al. ....................... 713/2 |
| 2007/0294563 A1* | 12/2007 | Bose ................................. 714/5 |
| 2008/0082811 A1* | 4/2008 | Davis et al. ....................... 713/2 |
| 2008/0140819 A1* | 6/2008 | Bailey et al. ................... 709/223 |
| 2009/0100194 A1* | 4/2009 | Bhadri et al. .................. 709/244 |
| 2009/0103430 A1* | 4/2009 | Wang ............................. 370/221 |
| 2009/0132683 A1* | 5/2009 | Furuyama et al. ............ 709/220 |

OTHER PUBLICATIONS

"Preboot Execution Environment (PXE) Specification, Version 2.1", Intel Corporation, Sep. 20, 1999, 103 pages.

* cited by examiner

FAULT TOLERANCE IN A CLIENT SIDE PRE-BOOT EXECUTION

BACKGROUND OF THE INVENTION

1. Field of the Invention

This invention generally relates to fault tolerance in a pre-boot execution environment, and specifically to a client side pre-boot execution environment.

2. Background of the Invention

A common problem faced in the Information Technology (IT) sector is to ensure that client systems in an enterprise can boot appropriate software images using appropriate configuration parameters. These selected boot images and configuration parameters must be acquired from selected servers from within the enterprise as dictated by the needs of the particular environment, the capabilities or mission of the user, the resources available within the client, etc. Furthermore, these clients should boot consistently and in an interoperable manner regardless of the sources or vendors of the software and the hardware of both client and server machines.

Typically, this goal can be accomplished only through a uniform and consistent set of pre-boot protocol services within the client that ensure that network-based booting is accomplished following industry standard protocols used to communicate with the server. In addition, to ensure interoperability, the downloaded Network Bootstrap Program (NBP), hereinafter also referred to as a bootstrap file, must be presented with a uniform and consistent pre-boot operating environment within the booting client, so that it can accomplish its task independent of, for example, the type of network adapter implemented in the system.

This capability is generally useful in enhancing the manageability of the client machine in several situations; for example:

Remote new system setup. If the client does not have an OS installed on its hard disk, or the client has no hard disk at all, downloading an NBP from a server can help automate the OS installation and other configuration steps.

Remote emergency boot. If the client machine fails to boot due to a hardware or software failure, downloading an executable image from a server can provide the client with a specific executable that enables remote problem notification and diagnosis.

Remote network boot. In instances where the client machine has no local storage, it can download its system software image from the server in the course of normal operation.

Typically, the Preboot Execution Environment (PXE). PXE embodies three technologies that will establish a common and consistent set of pre-boot services within the boot firmware of Intel Architecture systems:

A uniform protocol for the client to request the allocation of a network address and subsequently request the download of an NBP from a network boot server.

A set of APIs available in the machine's pre-boot firmware environment that constitutes a consistent set of services that can be employed by the NBP or the BIOS.

A standard method of initiating the pre-boot firmware to execute the PXE protocol on the client machine.

Therefore, using the capabilities described above, a newly installed networked client machine should be able to enter a heterogeneous network, acquire for itself a network address from a Dynamic Host Configuration Protocol (DHCP) server, and then download an NBP to set itself up. This sets the stage to enable IT managers to customize the manner in which their network client machines go through a network-based booting process. When PXE is used to boot or install an OS in a machine, the scenario is to download the OS image from a PXE server through a Network adapter, network interface card, (NIC). The existing implementation of PXE restricts to the use of only one NIC at a time, even if more are available in the machine. If the NIC fails in between the downloading process, the scheduled job needs to be restarted by restarting the client machine itself. Therefore, a disadvantage is that the time spent would be in vain and there would be an unnecessary increase in network traffic.

A known solution to overcome the disadvantage observed with the single NIC is made available in the Dell PowerEdge 1655MC blade server, where one can set the server to be in fault tolerant PXE mode, so that problems that arise due to NIC failure are averted, see http://www.dell.com/content/topics/global.aspx/power/en/ps1q03_jaffe. The disadvantages with the existing solution are:

the already existing IT installation needs to be replaced with Dell 1655MC to accommodate fault tolerance.

the implementation needs to be hard coded in the firmware. Hence, BIOS re-flashing and additional firmware memory may be required to accommodate fault tolerance in existing IT installations.

Without a way to provide an improved method and system to manage fault tolerance in the pre-boot execution environment, the promise of this technology may never be fully achieved.

SUMMARY OF THE INVENTION

The present invention relates to a method and system for efficiently managing fault tolerance in a pre-boot execution environment. In one illustrative embodiment, a method is provided for booting a client computer over a data network using a server. The method may comprise activating a first network interface card on the client computer and using the first network interface card to establish a connection between the client computer and the server. The method may further comprise initiating a booting process of the client computer over the network using the server via the first network interface card. Moreover, the method may comprise monitoring the booting process of the client computer and, in response to detecting a failure of the first network interface card on the client computer, automatically activating a second network interface card on the client computer to continue the booting process of the client computer In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
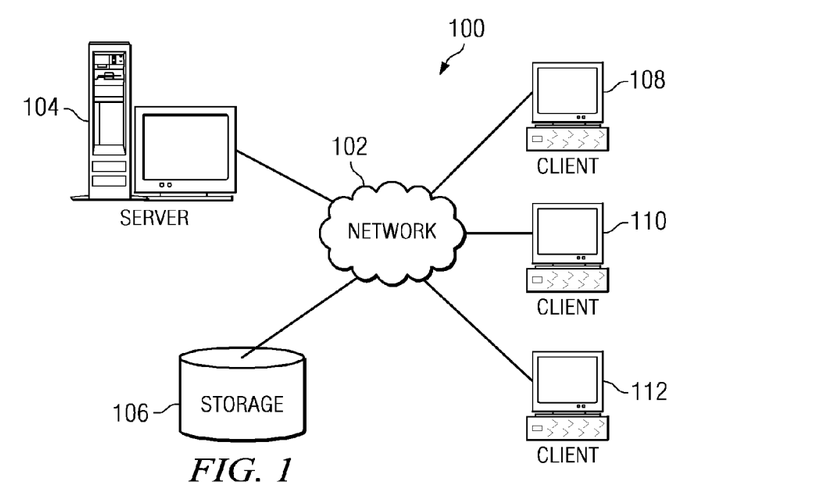
FIG. 1 depicts a representation of a network of data processing systems in which the illustrative embodiments may be implemented.

With reference now to the figures, FIG. 1 depicts a pictorial representation of a network of data processing systems in which the illustrative embodiments may be implemented. Network data processing system 100 is a network of computers in which the illustrative embodiments may be implemented. Network data processing system 100 contains a network 102, which is the medium used to provide communications links between various devices and computers connected together within network data processing system 100. Network 102 may include connections, such as wire, wireless communication links, fiber optic cables or a combination thereof.

In the depicted example, server 104, preferably a pre-boot execution server, is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. In one illustrative embodiment, these files are stored by the server in a filesystem. The clients also store files in a filesystem. These file systems may include, for example, a Windows NT™ filesystem (NTFS) or a Windows™ based filesystem, such as FAT32, available from Microsoft Corporation, an AIX file system available from International Business Machines Corporation of Armonk, N.Y., a UNIX filesystem such as System V Release 4 (SVR4), or a Linux filesystem. Network data processing system 100 may include additional servers, clients, and other devices not shown.

In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprised of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention and thus, many modifications may be made to the depicted architecture without departing from the spirit and scope of the illustrative embodiments.

Figure 2:
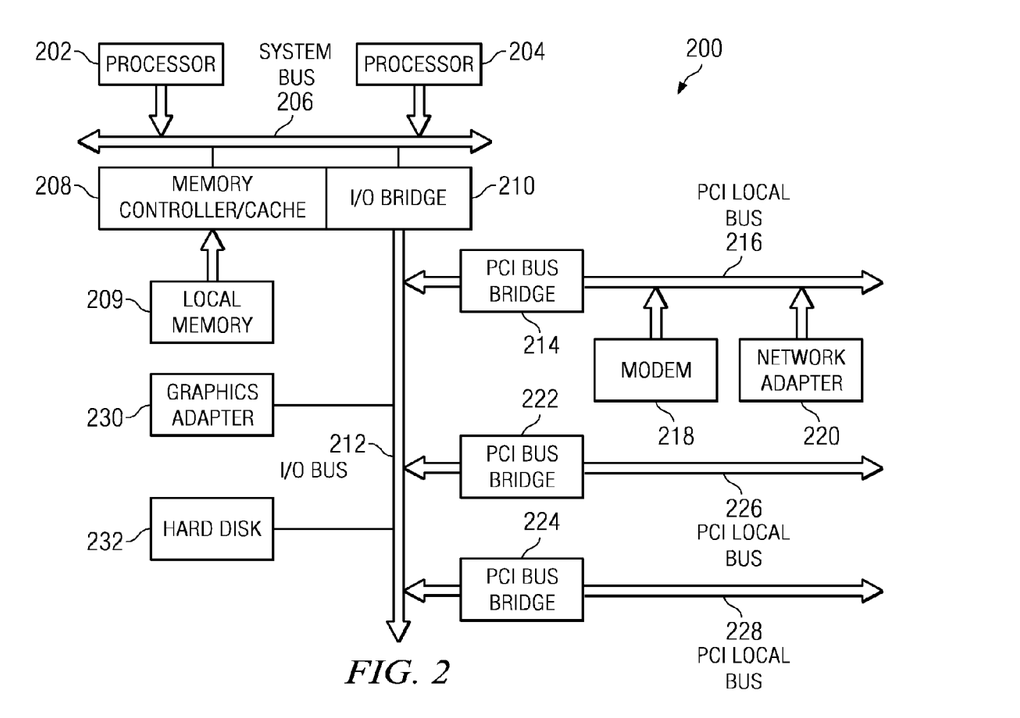
FIG. 2 is an exemplary block diagram of a data processing system that may be implemented as a server of the network of FIG. 1 in which exemplary aspects of the illustrative embodiments may be implemented.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

The data processing system depicted in FIG. 2 may be, for example, an IBM eServer pSeries system, a product of International Business Machines Corporation of Armonk, N.Y., running the Advanced Interactive Executive (AIX) operating system or LINUX operating system. However, those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention but is offered as only an example. Many modifications to the architecture shown in FIG. 2 may be made without departing from the spirit and scope of the illustrative embodiments.

Figure 3:
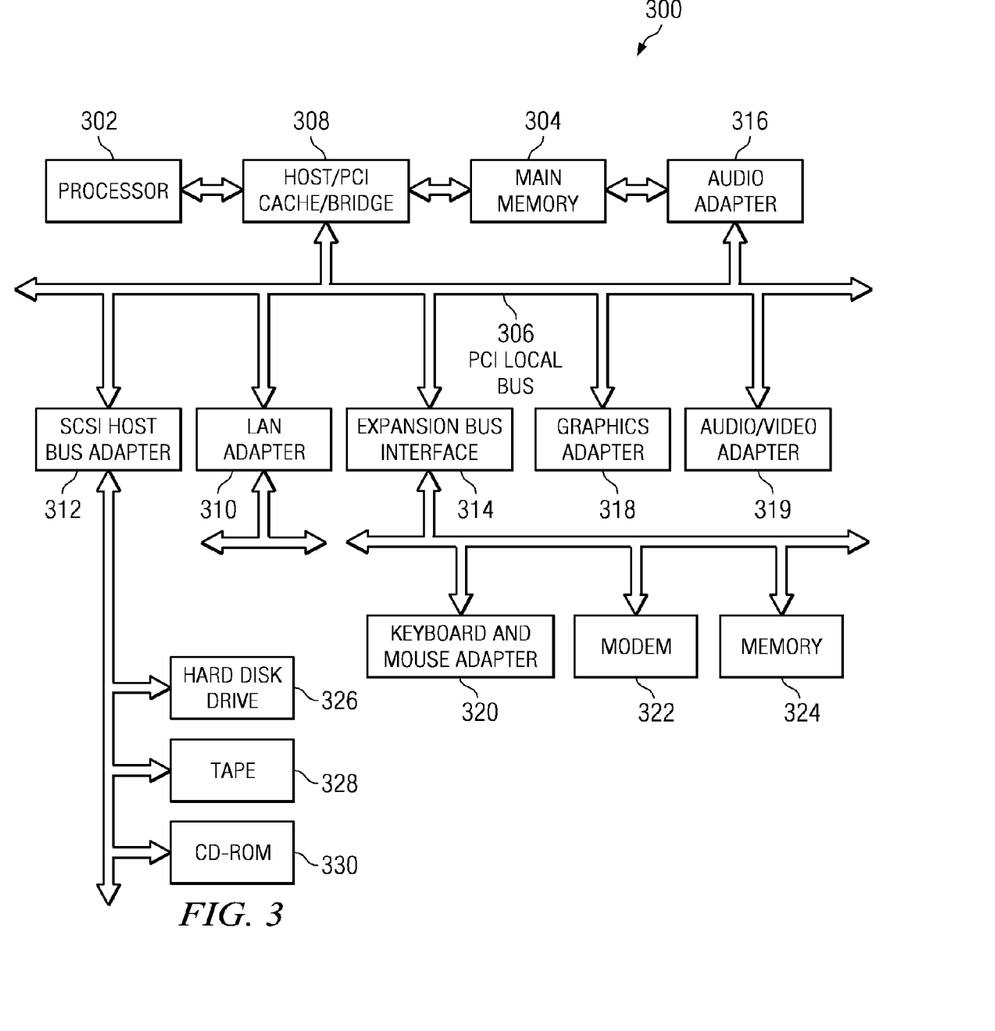
FIG. 3 is an exemplary block diagram illustrating a data processing system that may be implemented as a client of the network of FIG. 1 in which exemplary aspects of the illustrative embodiments may be implemented.

With reference now to FIG. 3, a block diagram illustrating a data processing system is depicted that may be implemented as a client computer in FIG. 1, for example. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000/XP, which is available from Microsoft Corporation, or any other operating system. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the illustrative embodiments may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations and thus, many modifications to the depicted examples may be made without departing from the spirit and scope of the illustrative embodiments. For example, data processing system 300 may also be a notebook computer or hand held computer in addition to taking the form of a PDA. Data processing system 300 also may be a kiosk or a Web appliance.

PXE is defined on a foundation of industry-standard Internet protocols and services that are widely deployed in the industry, namely TCP/IP, DHCP, and TFTP. These standardize the form of the interactions between clients and servers. To ensure that the meaning of the client-server interaction is standardized as well, certain vendor option fields in DHCP protocol are used, which are allowed by the DHCP standard. The operations of standard DHCP and/or BOOTP servers (that serve up IP addresses and/or Network Bootstrap Programs (NBPs)) will not be disrupted by the use of the extended protocol. Clients and servers that are aware of these extensions will recognize and use this information, and those that do not recognize the extensions will ignore them.

Typically, the PXE protocol operates as follows. The client initiates the protocol by broadcasting a DHCPDISCOVER containing an extension that identifies the request as coming from a client that implements the PXE protocol. Assuming that a DHCP server or a Proxy DHCP server implementing this extended protocol is available, after several intermediate steps, the server sends the client a list of appropriate Boot Servers. The client then discovers a Boot Server of the type selected and receives the name of an executable file on the chosen Boot Server. The client uses Trivial File Transfer Protocol (TFTP) to download the executable from the Boot Server. Finally, the client initiates execution of the downloaded image. At this point, the client's state must meet certain requirements that provide a predictable execution environment for the image. Important aspects of this environment include the availability of certain areas of the client's main memory, and the availability of basic network I/O services.

On the server end of the client-server interaction there must be available services that are responsible for providing redirection of the client to an appropriate Boot Server. These redirection services may be deployed in two ways:

1. Combined standard DHCP and redirection services. The DHCP servers that are supplying IP addresses to clients are modified to become, or are replaced by servers that serve up IP addresses for all clients and redirect PXE-enabled clients to Boot Servers as requested.

2. Separate standard DHCP and redirection services. PXE redirection servers (Proxy DHCP servers) are added to the existing network environment. They respond only to PXE-enabled clients, and provide only redirection to Boot Servers. Each PXE Boot Server must have one or more executables appropriate to the clients that it serves.

PXE does not specify the operational details and functionality of the NBP that the client receives from the server. However, the intent is that running this executable will result in the system's being ready for use by its user. At a minimum, this means installing an operating system, drivers, and software appropriate to the client's hardware configuration. It might also include user-specific system configuration and application installation. PXE specifies the protocols by which a client requests and downloads an executable image from a Boot Server and the minimum requirements on the client execution environment when the downloaded image is executed.

To enable the interoperability of clients and downloaded bootstrap programs, the client PXE code provides a set of services for use by the BIOS or a downloaded NBP. The API services provided by PXE for use by the BIOS or NBP are:

Preboot Services API. Contains several global control and information functions.

Trivial File Transport Protocol (TFTP) API. Enables opening and closing of TFTP connections, and reading packets from and writing packets to a TFTP connection.

User Datagram Protocol (UDP) API. Enables opening and closing UDP connections, and reading packets from and writing packets to a UDP connection.

Universal Network Driver Interface (UNDI) API. Enables basic control of and I/O through the client's network interface device. This allows the use of universal protocol drivers such that the same universal driver can be used on any network interface that implements this API.

The description of PXE Client/Server Protocol assumes knowledge of the standard DHCP/BOOTP protocols and is well understood by one skilled in the art.

A step-by-step synopsis of the PXE protocol is discussed below.

Step 1. The client broadcasts a DHCPDISCOVER message to the standard DHCP port (67). An option field in this packet contains the following:

A tag for client identifier (UUID).

A tag for the client UNDI version.

A tag for the client system architecture.

A DHCP option 60, Class ID, set to "PXEClient:Arch: xxxxx:UNDI:yyyzzz".

Step 2. The DHCP or Proxy DHCP Service responds by sending a DHCPOFFER message to the client on the standard DHCP reply port (68). If this is a Proxy DHCP Service, then the client IP address field is null (0.0.0.0). If this is a DHCP Service, then the returned client IP address field is valid. At this point, other DHCP Services and BOOTP Services also respond with DHCP offers or BOOTP reply messages to port (68). Each message contains standard DHCP parameters: an IP address for the client and any other parameters that the administrator might have configured on the DHCP or Proxy DHCP Service. The timeout for a reply from a DHCP server is standard. The timeout for re-broadcasting to receive a DHCPOFFER with PXE extensions, or a Proxy DHCPOFFER is based on the standard DHCP timeout but is substantially shorter to allow reasonable operation of the client in standard BOOTP or DHCP environments that do not provide a DHCPOFFER with PXE extensions.

Step 3. From the DHCPOFFER(s) that it receives, the client records the following:
  The Client IP address (and other parameters) offered by a standard DHCP or BOOTP Service.
  The Boot Server list from the Boot Server field in the PXE tags from the DHCPOFFER.
  The Discovery Control Options (if provided).
  The Multicast Discovery IP address (if provided).

Step 4. If the client selects an IP address offered by a DHCP Service, then it must complete the standard DHCP protocol by sending a request for the address back to the Service and then waiting for an acknowledgment from the Service. If the client selects an IP address from a BOOTP reply, it can simply use the address.

Step 5. The client selects and discovers a Boot Server. This packet may be sent broadcast (port 67), multicast (port 4011), or unicast (port 4011) depending on discovery control options included in the previous DHCPOFFER containing the PXE service extension tags. This packet is the same as the initial DHCPDISCOVER in Step 1, except that it is coded as a DHCPREQUEST and now contains the following:
  The IP address assigned to the client from a DHCP Service.
  A tag for client identifier (UUID)
  A tag for the client UNDI version.
  A tag for the client system architecture.
  A DHCP option 60, Class ID, set to "PXEClient:Arch: xxxxx:UNDI:yyyzzz".
  The Boot Server type in a PXE option field Step 6. The Boot Server unicasts a DHCPACK packet back to the client on the client source port. This reply packet contains:
  Boot file name.
  MTFTP1 configuration parameters.
  Any other options the NBP requires before it can be successfully executed.

Step 7. The client downloads the executable file using either standard TFTP (port69) or MTFTP (port assigned in Boot Server Ack packet). The file downloaded and the placement of the downloaded code in memory is dependent on the client's CPU architecture.

Step 8. The PXE client determines whether an authenticity test on the downloaded file is required. If the test is required, the client sends another DHCPREQUEST message to the boot server requesting a credentials file for the previously downloaded boot file, downloads the credentials via TFTP or MTFTP, and performs the authenticity test.

Step 9. Finally, if the authenticity test succeeded or was not required, then the PXE client initiates execution of the downloaded code.

With regard to the illustrative embodiments of the present invention, the client computer performing a booting process using the above PXE protocol has a plurality of network interface cards through which the client computer may communicate with the server. Upon initiating the PXE protocol, a communication connection with the server is negotiated via one of the network interface cards in the manner discussed above. However, it should be appreciated that during the PXE process, there is a possibility that the network interface card, through which the communication connection with the server is established, may fail. In known systems, such a failure would cause the booting processing to fail and would require that the entire booting process be restarted, for example, by powering off and powering back on the client computer.

The illustrative embodiments provide mechanisms for ensuring a virtually uninterrupted booting process by providing the ability to switch operations over from the network interface card originally being used to communicate with the server, to another network interface card of the client computer so that the booting process can be completed using this other network interface card. When the client computer establishes a communication connection with the server, the client computer downloads a bootstrap file that contains code for monitoring the execution of the boot code used to boot the client to determine if a failure of the network interface card is encountered. For example, this monitoring may determine if the network interface card returns an error, or times out, in response to a transmission request or fails to forward additional data to the processor for continuing a boot process within a predetermined period of time. The bootstrap file may be executed by a processor in the client computer in order to initiate a boot process on the client computer. The bootstrap file, when executed by a processor, may cause the processor to periodically determine if a failure of a network interface card has occurred or not, such as by polling the network interface card and determining if a response is received within a predetermine period of time, for example.

In response to detecting a failure of the network interface card, the bootstrap file may further execute code to switch the boot process over from the original network interface card to a next available network interface card in a plurality of network interface cards available in the client computer. The boot process may then continue using the alternative network interface card thereby booting the client computer with a virtually uninterrupted boot process. This operation may be repeated with each subsequent network interface card failure should more than one network interface card fail in the client computer.

In an alternative illustrative embodiment, rather than having to detect an actual failure of the network interface card, code for performing a prediction of whether the network interface card is about to fail or not may be included in the bootstrap file. This prediction code may utilize a Bayesian Belief Network to predict whether a failure of the network interface card is imminent. This Bayesian Belief Network may make use of data stored in a repository on a storage medium coupled to the server. Moreover, the repository may maintain historical data built over time with regard to whether boot processes with the client computer have failed or not, such as due to a communication error. Such historical information may provide an indication as to whether the network interface card is likely to fail again during a boot process.

Figure 4:
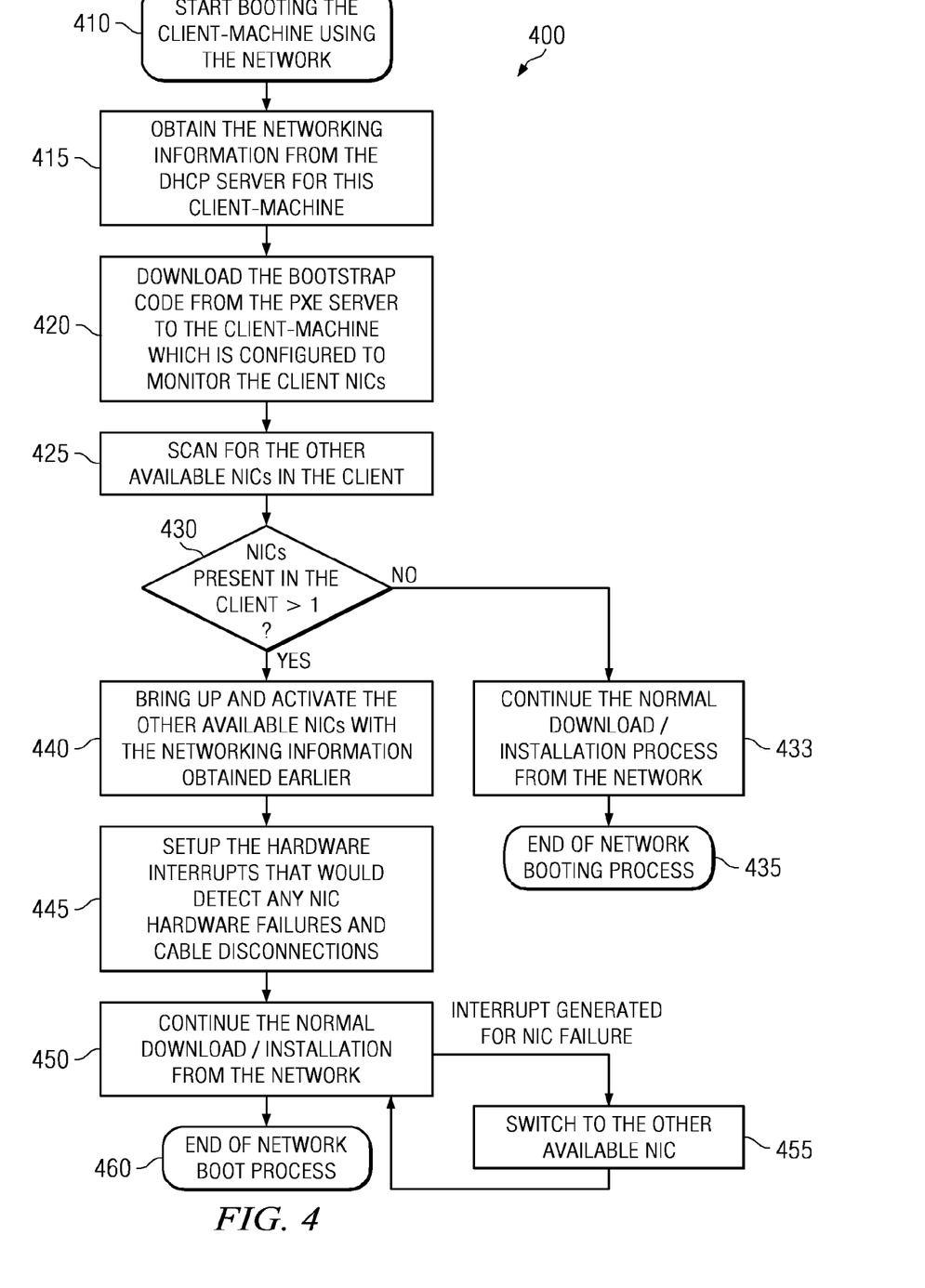
FIG. 4 is a flowchart outlining an exemplary operation of a pre-boot execution environment in accordance with a one illustrative embodiment of the present invention.

FIG. 4 is an exemplary diagram outlining an operation for a pre-boot execution environment in accordance with one illustrative embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

To start the PXE boot, a first bootstrap file is downloaded from the server onto the client. In step 410, the process of booting the client begins, where the client is coupled to at least one of the servers available on a network, and the server storing the network bootstrap file. In step 415, the client on the network is configured to obtain the networking information, in particular networking information from the DHCP server. DHCP (Dynamic Host Configuration Protocol) server is a server on the network which issues the IP address for the machine connected to the network and other related networking information.

Once the DHCP information is obtained for the client machine, which is coupled to the server from the DHCP server, in step 420, network bootstrap file is downloaded from the server, preferably PXE server onto the client. The bootstrap program typically contains code and/or instruction to perform a variety of tasks in an organized manner including monitoring the NICs available on the client. In step 425, since one of the NICs is registered with the DHCP server, the client when the bootstrap program is executed, makes a list of all the other available NICs on the client. In a preferred embodiment, the client consists of more than one NIC.

In step 430, the client performs a check to detect if there are more than one NIC available on the client. In one illustrative embodiment (wherein the client detects only one NIC available), in step 433 the operation continues with the installation or download process in progress and, in step 435, the process terminates in a normal manner. In an alternate illustrative embodiment (wherein the client detects the availability of more than one NIC), since the client is constantly monitoring the functioning of the NIC, when the client detects that the NIC which was functional has failed, or predicatively determines that the NIC will fail, in step 440, the client is configured to activate the next available NIC and obtain the network information. Subsequently, in step 445, the client is configured to set up the hardware interrupts that would detect any NIC hardware failures and cable disconnections. In step 450, the operation continues with the installation or download process and constantly monitors the NIC. In step 455, when a NIC failure is detected, or it can be predicted that the NIC is about to fail, the client is configured to dynamically bring up the next available NIC to continue uninterrupted installation or execution in the PXE environment. In step 460, the process terminates after completion.

As will be readily apparent to those skilled in the art, the preset invention, or aspects of the invention, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for booting a client computer over a data network using a server, the method comprising:
   activating a first network interface card on the client computer;
   using the first network interface card to establish a connection between the client computer and the server;
   downloading into the client computer from the server, before initiating a booting process, a network bootstrap file, wherein the network bootstrap file enables dynamic switching between network interface cards of the client computer;
   initiating, by execution of the network bootstrap file on the client computer, a booting process of the client computer over the network using the server via the first network interface card;
   monitoring, by the network bootstrap file executing on the client computer, the booting process of the client computer; and
   in response to detecting, by the network bootstrap file executing on the client computer, a failure of the first network interface card on the client computer, automatically activating a second network interface card on the client computer to continue the booting process of the client computer, wherein a failure of the first network card is detected by predicting whether the first network card is going to fail based on historical data of nor executions of boot processes on the client computer stored in a repository.

2. The method of claim 1, wherein the server is a pre-boot execution server.

3. The method of claim 1, further comprising periodically determining if a failure of the first network card is detected.

4. A data processing system, comprising:
   a processor; and
   a plurality of network cards coupled to the processor, wherein:
   a first network card is activated and used to establish a connection between the data processing system and a server,
   the processor downloads, from the server, before initiating a booting process, a network bootstrap file, wherein the network bootstrap file enables dynamic switching between network interface cards of the client computer;
   the processor initiates, by execution of the network bootstrap file on the processor, a booting process using the server via the first network card;
   the processor monitors, by execution of the network bootstrap file on the processor, the booting process; and
   in response to detecting, by the network bootstrap file executing on the processor, a failure of the first network card on the client computer, the processor automatically activates a second network card on the client computer to continue the booting process of the client computer, wherein a failure of the first network card is detected by predicting whether the first network card is going to fail based on historical data of prior executions of boot processes on the client computer stored in a repository.

5. The data processing system of claim 4, wherein the server is a pre-boot execution server.

6. The data processing system of claim 4, wherein the processor periodically determines if a failure of the first network card is detected.

7. A computer program product comprising a computer recordable device having a computer readable program recorded thereon, wherein the computer readable program, when executed on a client computer, causes the client computer to:
   activate a first network interface card on the client computer;
   use the first network interface card to establish a connection between the client computer and a server;
   download into the client computer from the server, before initiating a booting process, a network bootstrap file, wherein the network bootstrap file enables dynamic switching between network interface cards of the client computer;
   initiate, by execution of the network bootstrap file on the client computer, a booting processing of the client computer over the network using the server via the first network interface card;
   monitor, by the network bootstrap file executing on the client computer, the booting process of the client computer; and
   in response to detecting, by the network bootstrap file executing on the client computer, a failure of the first network interface card on the client computer, automatically activate a second network interface card on the client computer to continue the booting process of the client computer, wherein a failure of the first network card is detected by predicting whether the first network card is going to fail based on historical data of prior executions of boot processes on the client computer stored in a repository.

* * * * *